United States Patent
Kozono et al.

(10) Patent No.: US 9,601,811 B2
(45) Date of Patent: Mar. 21, 2017

(54) NONAQUEOUS ELECTROLYTE SECONDARY CELL

(71) Applicant: GS Yuasa International Ltd., Kyoto-shi, Kyoto (JP)

(72) Inventors: Suguru Kozono, Kyoto (JP); Yasuyuki Abe, Kyoto (JP); Kazushi Nitta, Kyoto (JP); Takaaki Iguchi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 34 days.

(21) Appl. No.: 14/033,143

(22) Filed: Sep. 20, 2013

(65) Prior Publication Data

US 2014/0087269 A1    Mar. 27, 2014

(30) Foreign Application Priority Data

Sep. 21, 2012  (JP) ................................ 2012-208495
Aug. 22, 2013  (JP) ................................ 2013-172299

(51) Int. Cl.
*H01M 2/00*   (2006.01)
*H01M 10/0587*   (2010.01)
(Continued)

(52) U.S. Cl.
CPC ......... *H01M 10/0587* (2013.01); *H01M 2/14* (2013.01); *B60L 11/1879* (2013.01);
(Continued)

(58) Field of Classification Search
CPC ........... B60L 11/1879; H01M 10/0566; H01M 10/058; H01M 10/0587; H01M 2010/4292;
(Continued)

(56) References Cited

U.S. PATENT DOCUMENTS

2007/0184349 A1   8/2007  Yasuda et al.
2010/0248026 A1*  9/2010  Hinoki ............... H01M 4/13
                                                          429/209
(Continued)

FOREIGN PATENT DOCUMENTS

JP   05-036442 A   2/1993
JP   06-283196 A   10/1994
(Continued)

OTHER PUBLICATIONS

"Targray PE separator product data sheet", Jan. 13, 2012 (Jan. 13, 2012), XP055224620.
(Continued)

*Primary Examiner* — Patrick Ryan
*Assistant Examiner* — Ben Lewis
(74) *Attorney, Agent, or Firm* — McGinn IP Law Group, PLLC.

(57) ABSTRACT

Provided is a nonaqueous electrolyte secondary cell including: a case; an element housed in the case, including at least a positive electrode member, a negative electrode member and a separator; and an electrolyte solution poured into the case, wherein when in the state of the case being installed, in the direction perpendicular to the liquid surface of the electrolyte solution, the length between the highest position and the lowest position of the element is represented by L1 and the length between the liquid surface and the lowest position of the element is represented by L2, the ratio calculated with the formula L2/L1×100 is 10% or more and 100% or less.

19 Claims, 5 Drawing Sheets

(51) Int. Cl.
*H01M 2/14* (2006.01)
*H01M 10/42* (2006.01)
*B60L 11/18* (2006.01)

(52) U.S. Cl.
CPC *H01M 2010/4292* (2013.01); *H01M 2220/20* (2013.01); *Y02T 10/7005* (2013.01); *Y02T 10/705* (2013.01); *Y02T 10/7011* (2013.01)

(58) Field of Classification Search
CPC ...... H01M 2220/20; H01M 2/14; H01M 2/36; Y02T 10/7005; Y02T 10/7011; Y02T 10/705
See application file for complete search history.

(56) References Cited

U.S. PATENT DOCUMENTS

| | | | |
|---|---|---|---|
| 2011/0039145 A1* | 2/2011 | Abe | H01M 2/145 429/144 |
| 2011/0136000 A1* | 6/2011 | Moon | H01M 2/0285 429/163 |
| 2012/0015238 A1* | 1/2012 | Minami | H01M 2/166 429/163 |

FOREIGN PATENT DOCUMENTS

| | | |
|---|---|---|
| JP | 10-247514 A | 9/1998 |
| JP | 11-185798 A | 7/1999 |
| JP | 2002-270225 A | 9/2002 |
| JP | 2010-198953 A | 9/2010 |
| WO | WO 2005/093890 A1 | 10/2005 |

OTHER PUBLICATIONS

Shriram Santhanagopalan, et al.: "Chapter 5-Separators for Lithium-Ion Batteries" Lithium-Ion Batteries: Advanced Materials and Technologies, Jan. 1, 2011 (Jan. 1, 2011), pp. 197-251, XP055195568.

European Search Report dated Nov. 26, 2013.

* cited by examiner

NONAQUEOUS ELECTROLYTE SECONDARY CELL

CROSS-REFERENCE TO RELATED APPLICATIONS

This application claims the benefit of Japanese Patent Application Nos. 2012-208495 and 2013-172299, filed on Sep. 21, 2012 and Aug. 22, 2013, respectively, which are incorporated herein by reference.

FIELD

The present invention relates to a nonaqueous electrolyte secondary cell.

BACKGROUND

There has hitherto been generally known a nonaqueous electrolyte secondary cell having a configuration in which an element including at least a positive electrode active material and a negative electrode active material is housed in a case. An example of the cell having such a configuration includes a lithium-ion battery cell mounted, for example, in a hybrid electric vehicle (HEV). The element is configured by at least a positive electrode plate carrying a positive electrode active material, a negative electrode plate carrying a negative electrode active material and a separator disposed between the positive electrode plate and the negative electrode plate. An electrolyte solution is poured into the case. The electrolyte solution is impregnated into the element.

For such a type of nonaqueous electrolyte secondary cell, it is proposed that the amount of the electrolyte solution in the case is set in such a way that the amount of the electrolyte solution has a predetermined relation to the total pore volume of the element and the volume of the external and internal spaces of the element (see, Japanese Patent Application Laid-Open No. 2002-270225). The amount of the electrolyte solution set in this way enables the prevention of the shortage of electrolyte solution even when charge and discharge is repeated, and also enables the avoidance of the superfluous presence of the electrolyte solution in the case. As a result, it is possible to achieve high capacity and prevent leakage of the electrolyte solution.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide a nonaqueous electrolyte secondary cell that is capable of suppressing the degradation of the input-output performance immediately after the repeated charge and discharge and also achieving weight reduction.

A nonaqueous electrolyte secondary cell according to an aspect of the present invention includes: a case; an element housed in the case, the element including a positive electrode member, a negative electrode member and a separator; and an electrolyte solution poured into the case, wherein, in a direction perpendicular to a liquid surface of the electrolyte solution, the ratio calculated with the formula L2/L1× 100 is 10% or more and 100% or less, where L1 represents a length between a first portion of the element, which is at a highest position, and a second portion of the element, which is at a lowest position, and L2 represents a length between the liquid surface and the second portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
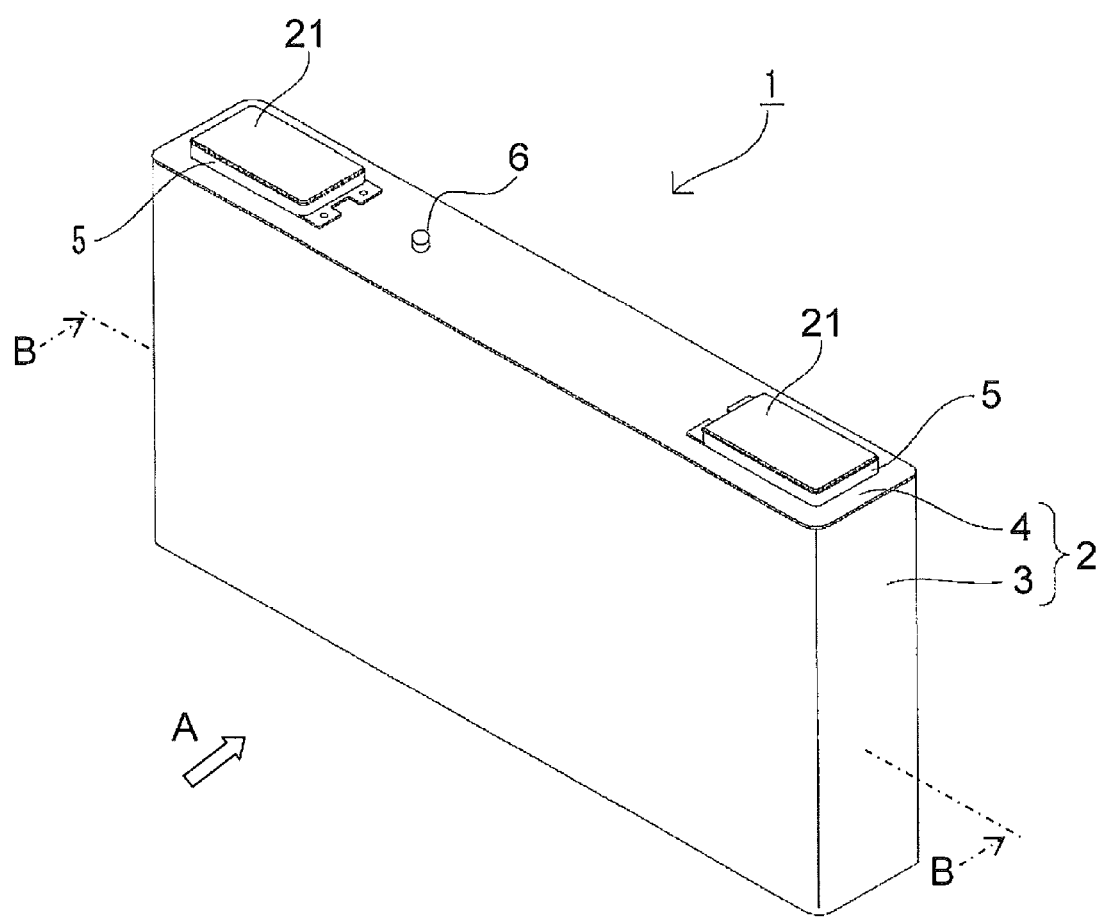
FIG. 1 is a schematic perspective view illustrating a nonaqueous electrolyte secondary cell of an embodiment of the present invention.
Figure 2:
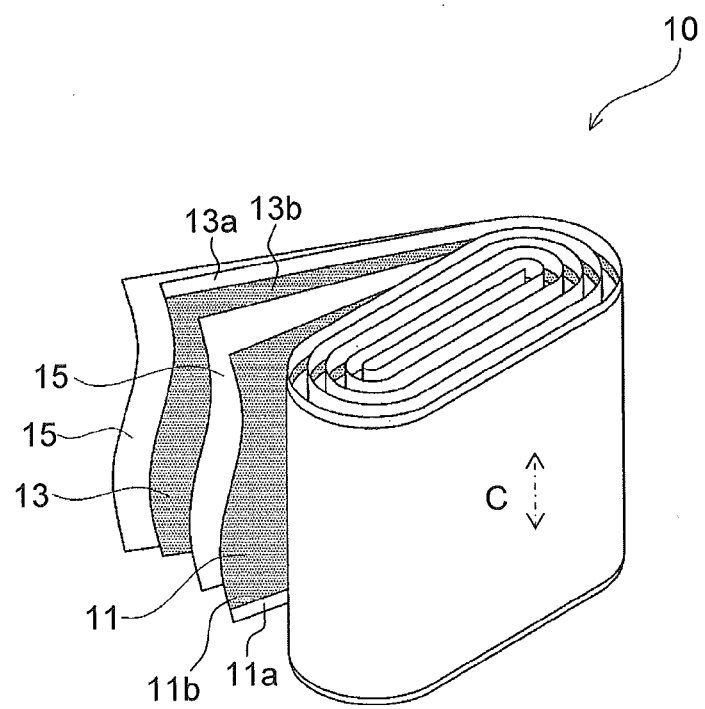
FIG. 2 is a schematic perspective view illustrating the element provided in the nonaqueous electrolyte secondary cell of the embodiment.
Figure 3:
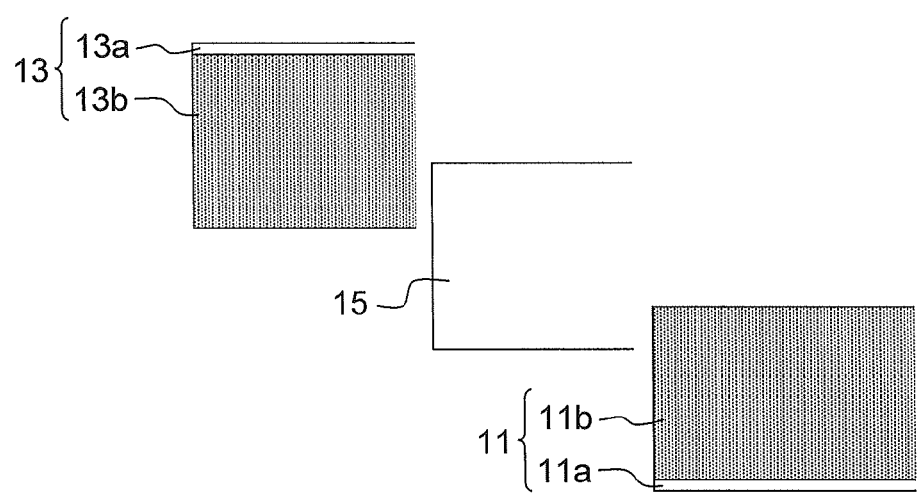
FIG. 3 is a schematic plan view schematically illustrating a positive electrode member, a separator and a negative electrode member in FIG. 2.

A nonaqueous electrolyte secondary cell according to a present embodiment includes: a case; an element housed in the case, the element including a positive electrode member, a negative electrode member and a separator; and an electrolyte solution poured into the case. In a direction perpendicular to a liquid surface of the electrolyte solution, the ratio calculated with the formula L2/L1×100 is 10% or more and 100% or less, where L1 represents a length between a first portion of the element, which is at a highest position, and a second portion of the element, which is at a lowest position, and L2 represents a length between the liquid surface and the second portion.

That is, in the nonaqueous electrolyte secondary cell of the present embodiment, when in the state of the case being installed, in the direction perpendicular to the liquid surface of the electrolyte solution, the length between the highest position and the lowest position of the element is represented by L1 and the length between the liquid surface and the lowest position is represented by L2, the ratio calculated with the formula L2/L1×100 is 10% or more and 100% or less.

Here, "the length between the first portion and the second portion" (that is, "the length between the highest position and the lowest position") means the length of the straight-line segment connecting, with the shortest distance, the plane parallel to the liquid surface, passing the highest portion of the element, and the plane parallel to the liquid surface, passing the lowest portion of the element. Also, the "length between the liquid surface and the second portion" means the length of the straight-line segment connecting, with the shortest distance, the liquid surface and the plane parallel to the liquid surface, passing the lowest portion of the element.

According to the nonaqueous electrolyte secondary cell having such a configuration, the ratio of 10% or more allows the electrolyte solution to be sucked up in the element up to the vicinity of the uppermost portion in the mutually facing portions of the positive electrode active material and the negative electrode active material. Accordingly, the degradation of the input-output performance immediately after the repeated charge and discharge is suppressed. On the other hand, the ratio of 100% or less achieves weight reduction.

Consequently, according to the nonaqueous electrolyte secondary cell of the present embodiment, the degradation of the input-output performance immediately after the repeated charge and discharge is suppressed, and the weight reduction is also achieved.

As an aspect of the nonaqueous electrolyte secondary cell of the present embodiment, a nonaqueous electrolyte secondary cell having a ratio of 20% or more and 70% or less can be adopted.

According to the nonaqueous electrolyte secondary cell having such a configuration, the ratio of 20% or more allows the electrolyte solution to be more certainly sucked up in the element, and hence the degradation of the input-output performance is more suppressed.

Also, the ratio of 70% or less allows the weight reduction to be more achieved.

As another aspect of the nonaqueous electrolyte secondary cell of the present embodiment, a nonaqueous electrolyte secondary cell in which the air resistance of the separator is 100 seconds/100 cc or more can also be adopted.

As yet another aspect of the nonaqueous electrolyte secondary cell of the present embodiment, a nonaqueous electrolyte secondary cell which is charged and discharged at a large current can be adopted.

The charge and discharge at a large current is performed at at least either of 50 A or more or 10 ItA or more. It is preferable that the charge and discharge at a large current be performed at at least either of 1000 A or less or 200 ItA or less.

As a still yet another aspect of the nonaqueous electrolyte secondary cell of the present embodiment, a nonaqueous electrolyte secondary cell to be mounted in a hybrid electric vehicle can also be adopted.

Hereinafter, an embodiment of the nonaqueous electrolyte secondary cell according to the present invention is described with reference to the accompanying drawings.

As shown in FIG. 1 to FIG. 4, the nonaqueous electrolyte secondary cell 1 of the present embodiment includes a case 2, an element 10, and an electrolyte solution 20 (see FIG. 4 to FIG. 7). The element 10 is a power generating element, which is housed in the case 2 and includes a positive electrode member 11 and a negative electrode member 13. The electrolyte solution 20 is housed in the case 2 and the element 10 is immersed in the electrolyte solution 20 (see FIG. 4 to FIG. 7).

The case 2 has a case body 3 having an opening toward one side and housing the element 10, and a cover member 4 covering the opening of the case body 3.

The case body 3 and the cover member 4 are formed of, for example, a stainless steel plate, and are welded to each other.

In the cover member 4, two openings are formed. On the external surface of the cover member 4, external gaskets 5 being formed of an insulating material and having an opening formed therein are fitted.

The openings of the external gaskets 5 are located at the openings of the cover member 4, respectively. On the inside of the opening of each of the external gaskets 5, a part of an external terminal 21 is disposed.

The external terminals 21 pass through the opening of the external gasket 5 and the opening of the cover member 4. The external terminals 21 have projections projecting into the inside of the case body 3.

The external gaskets 5 and the external terminals 21 respectively include those for the positive electrode and the negative electrode. The external gasket 5 and the external terminal 21 for the positive electrode are disposed on one end in the lengthwise direction of the cover member 4, and the external gasket 5 and the external terminal 21 for the negative electrode are disposed on the other end in the lengthwise direction of the cover member 4.

The external terminal 21 for the positive electrode is formed of an aluminum-based metal material such as aluminum or an aluminum alloy. The external terminal 21 for the negative electrode is formed of a copper-based metal material such as copper or a copper alloy.

In the cover member 4, a pouring port 6 for pouring the electrolyte solution 20 into the inside of the case body 3 is formed. The pouring port 6 is designed to be closed after the pouring of the electrolyte solution 20.

The element 10 includes the positive electrode member 11, the negative electrode member 13 and the separator 15 disposed between these electrodes, and is formed by stacking them together and winding the stacked members.

The positive electrode member 11 has a positive electrode current collector 11*a* made of, for example, aluminum foil and a positive electrode active material 11*b*. The positive electrode member 11 is formed in a sheet-like shape by applying a positive electrode active material 11*b* on the positive electrode current collector 11*a*.

The negative electrode member 13 has a negative electrode current collector 13*a* made of, for example, copper foil and a negative electrode active material 13*b*. The negative electrode member 13 is formed in a sheet-like shape by applying a negative electrode active material 13*b* to the negative electrode current collector 13*a*.

The nonaqueous electrolyte secondary cell 1 of the present embodiment has a pair of current collecting members 9 respectively electrically connected to the external terminals 21. Each of the current collecting members 9 is electrically connected to the positive electrode member 11 or the negative electrode member 13.

Figure 4:
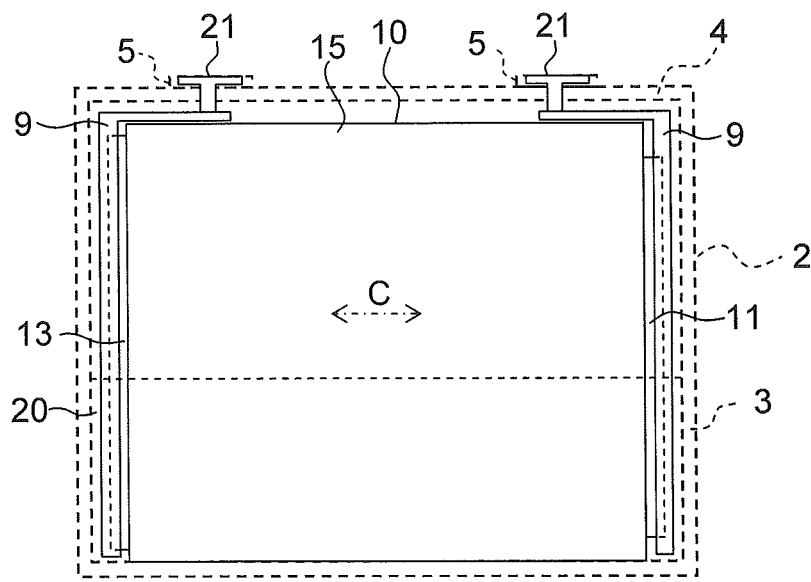
FIG. 4 is a schematic side view as viewed in the direction A of FIG. 1, schematically illustrating the internal structure of the nonaqueous electrolyte secondary cell of the embodiment.

Specifically, in the nonaqueous electrolyte secondary cell 1 of the present embodiment, as shown in FIG. 4, on one end in the widthwise direction (direction C) of the element 10, the edge (the right side in FIG. 4) of the positive electrode member 11 (specifically, the positive electrode current collector 11*a*) projects more outside (right side) than the negative electrode member 13 and the separator 15.

On the other hand, on the other end in the widthwise direction (direction C) of the element 10, the edge (the left side in FIG. 4) of the negative electrode member 13 (specifically, the negative electrode current collector 13*a*) projects more outside (the left side in FIG. 4) than the positive electrode member 11 and the separator 15.

The protrusion of the positive electrode member 11 and the protrusion of the negative electrode member 13 are respectively and electrically connected to the current collecting members 9.

The shape of each of the current collecting members 9 is not particularly limited, but is, for example, a plate-like shape. Each of the current collecting members 9 is welded to the protrusion of the corresponding external terminal 21 to be electrically connected to the corresponding external terminal 21.

These current collecting members 9 are each formed of the same type of metal material as the metal material constituting the electrode member to which the corresponding current collecting member 9 is to be connected. Each of the external terminals 21 is designed to be electrically connected to, for example, external devices.

The positive electrode active material 11b is a material capable of contributing in the positive electrode to the electrode reactions, namely, the charge reaction and the discharge reaction. Examples of such a positive electrode active material include lithium composite oxides such as lithium nickelate ($LiNiO_2$), lithium manganate ($LiMnO_2$) and lithium cobaltate ($LiCoO_2$).

The negative electrode active material 13b is a material capable of contributing in the negative electrode to the electrode reactions, namely, the charge reaction and the discharge reaction. Examples of such a negative electrode active material include carbon-based materials such as amorphous carbon, hardly graphitizable carbon, easily graphitizable carbon and graphite.

The separator 15 allows the passage of the electrolyte solution 20 while insulating the positive electrode 11 from negative electrode members 13.

Examples of the separator 15 include porous films formed of polyolefin resins such as polyethylene. Such a porous film may contain additives such as a plasticizer, an antioxidant and a flame retardant.

The air resistance of the separator 15 is preferably 100 seconds/100 cc or more so that the safety of the cell is made more excellent.

When the air resistance of the separator 15 is 100 seconds/100 cc or more, setting the ratio of L2/L1 to be 10% or more suppresses more sufficiently the degradation of the input-output performance of the cell immediately after the repeated charge and discharge.

The air resistance of the separator 15 is preferably 300 seconds/100 cc or less so that the input-output performance of the cell is made more excellent.

The air resistance of the separator 15 is a degree measured by the Gurley tester method in accordance with JIS P8117 of Japanese Industrial Standards (JIS).

The electrolyte solution 20 is prepared by dissolving an electrolyte in an organic solvent.

Examples of the organic solvent include ester-based solvents such as propylene carbonate (PC), ethylene carbonate (EC), dimethyl carbonate (DMC) and ethyl methyl carbonate (EMC).

Examples of the organic solvent also include solvents prepared by mixing ether-based solvents such as γ-butyrolactone (γ-BL) and diethoxyethane (DEE) with the ester-based solvents.

Examples of the electrolyte include lithium salts such as lithium perchlorate ($LiClO_4$), lithium borofluoride ($LiBF_4$) and lithium hexafluorophosphate ($LiPF_6$).

In the production of the nonaqueous electrolyte secondary cell 1, for example, after the current collecting members 9 are connected to the respective protrusions of the positive electrode member 11 and the negative electrode member 13, the element 10 and the current collecting members 9 are inserted into the case body 3. Next, the case body 3 is covered with the cover member 4 with the external gaskets 5 and the external terminals 21 mounted thereon, and then the case body 3 and the cover member 4 are welded to each other. Further, through the pouring port 6, the electrolyte solution 20 is poured. Then, the pouring port is closed. The cell is produced through these steps.

Inside the case body 3, one element 10 may be housed, or alternatively, a plurality of elements 10 may also be housed. When a plurality of elements 10 are housed in the case body 3, the plurality of elements 10 are electrically parallel-connected.

Figure 5:
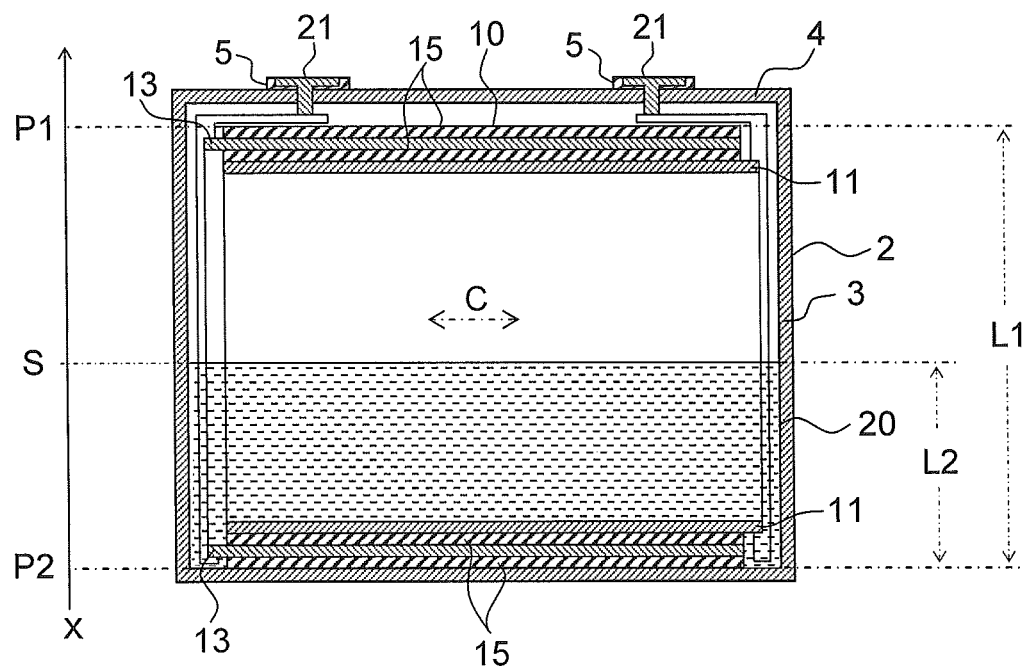
FIG. 5 is a view schematically illustrating the sectional view in the direction of the arrow BB in FIG. 1.
Figure 6:
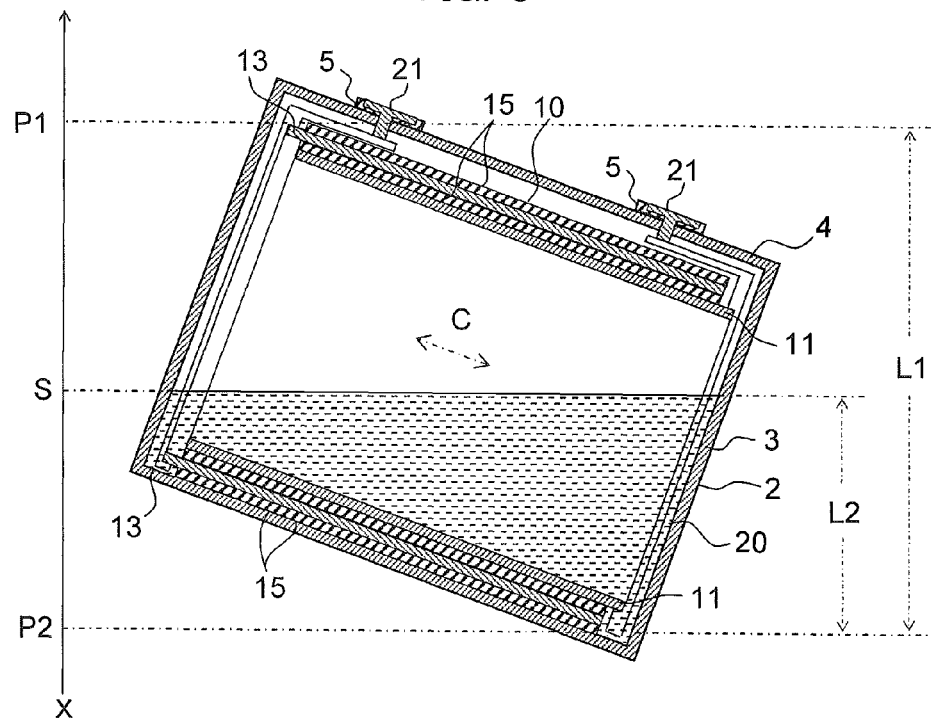
FIG. 6 is a view schematically illustrating the sectional view in the direction of the arrow BB in FIG. 1, showing the state of the nonaqueous electrolyte secondary cell being installed obliquely relative to the vertical direction from the state shown in FIG. 5.
Figure 7:
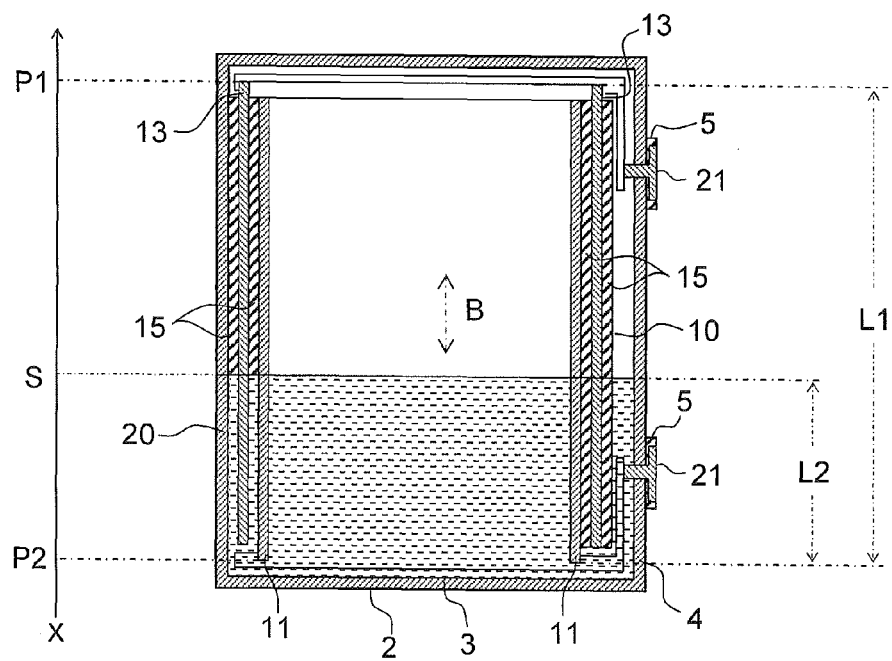
FIG. 7 is a view schematically illustrating the sectional view in the direction of the arrow BB in FIG. 1, showing the state of the nonaqueous electrolyte secondary cell being installed as horizontally overturned by 90° from the state shown in FIG. 5.

FIG. 5 to FIG. 7 show examples of the states of the nonaqueous electrolyte secondary cell 1 being installed of the present embodiment. FIG. 5 to FIG. 7 show only the outermost member in the wound stacked body composed of the positive electrode member 11, the separator 15, the negative electrode member 13 and the separator 15.

FIG. 5 shows as an example the nonaqueous electrolyte secondary cell 1 in a state of being installed in such a way that the side wall of the case body 3 is disposed in the vertical direction and the cover member 4 is disposed on the upper side.

FIG. 6 shows as an example the nonaqueous electrolyte secondary cell 1 in a state of being installed in such a way that the side wall of the case body 3 is inclined relative to the vertical direction from the state shown in FIG. 5, and the cover member 4 is disposed on the upper side.

FIG. 7 shows as an example the nonaqueous electrolyte secondary cell 1 in a state of being installed in such a way that the nonaqueous electrolyte secondary cell 1 is overturned by 90° from the state shown in FIG. 5 so as to allow the side wall of the case body 3 to be horizontal and the cover member 4 is disposed on the lateral side.

The state of the nonaqueous electrolyte secondary cell 1 being installed is not limited to these modes, and for example, another mode in which the nonaqueous electrolyte secondary cell is installed in such a way that the cover member 4 is disposed on the lower side may also be adopted.

In FIG. 5 to FIG. 7, the element 10 is housed in the case body 3 in such a way that the widthwise direction (direction C) of each of the positive electrode member 11 and the negative electrode member 13 is parallel to the bottom face of the case body 3. Alternatively, the element 10 may be housed in the case body 3 in such a way that the widthwise direction of each of the positive electrode and negative electrode members 11 and 13 is parallel to the side wall of the case body 3.

In such states of the case 2 being installed as described above, the electrolyte solution 20 is housed inside the case 2, and further, the element 10 is immersed in the electrolyte solution 20, and consequently, the positive electrode member 11, the negative electrode member 13 and the separator 15 are immersed in the electrolyte solution 20.

As shown in FIG. 5 to FIG. 7, P1 represents a position (height) of the highest portion of the element 10 in the vertical direction (the direction perpendicular to the liquid surface S of the electrolyte solution 20), and P2 represents a position (height) of the lowest portion of the element 10. L1 represents the length between the position P1 and the position P2, and L2 represents the length between the liquid surface S and the position P2.

With the lengths represented by L1 and L2, the nonaqueous electrolyte secondary cell 1 of the present embodiment is set in such a way that the ratio calculated by the formula L2/L1×100 is 10% or more and 100% or less.

Specifically, as shown in FIG. 5 to FIG. 7, the liquid surface S of the electrolyte solution 20 is kept horizontal by the gravity irrespective of the state of the case 2 being installed.

The highest position P1 is the position of any of the positive electrode member 11, the negative electrode member 13 and the separator 15 in the vertical direction (the direction X in FIG. 5 to FIG. 7) which is positioned highest in the state of the case 2 being installed (see the position P1 in FIG. 5 to FIG. 7).

The lowest position P2 is the position of any of the positive electrode member 11, the negative electrode member 13 and the separator 15 in the vertical direction (the direction X in FIG. 5 to FIG. 7) which is positioned lowest in the state of the case 2 being installed (see the position P2 in FIG. 5 to FIG. 7).

The length L1 is the length (see the length L1 in FIG. 5 to FIG. 7) in the vertical direction connecting the plane parallel to the liquid surface S passing the position P1 and the plane parallel to the liquid surface S passing the position P2 with the shortest distance.

The length L2 is the length (see the length L2 in FIG. 5 to FIG. 7) in the vertical direction connecting the plane parallel to the liquid surface S passing through the position P2 and the liquid surface S with the shortest distance.

When the element 10 has members other than the positive electrode member 11, the negative electrode member 13 and the separator 15, the portion of any of all of those members which is positioned highest serves as P1, and the portion of any of all of those members which is positioned lowest serves as P2, respectively.

The ratio of L2 to L1 of 10% or more allows the electrolyte solution 20 to be sucked up in the element 10 (mainly in the separators 15) up to the vicinity of the highest portions of the mutually facing portions of the positive electrode active material 11b and the negative electrode active material 13b. Hence the degradation of the input-output performance immediately after the repeated charge and discharge is suppressed. The ratio of 100% or less achieves the weight reduction.

Accordingly, the ratio of 10% or more and 100% or less suppresses the degradation of the input-output performance immediately after the repeated charge and discharge and achieves the weight reduction.

The mode having the ratio exceeding 100% means that the positive electrode active material 11b and the negative electrode active material 13b are all immersed so as to be lower than the liquid surface S of the electrolyte solution 20.

With the increase of the ratio, the electrolyte solution 20 can be more certainly sucked up in the element 10 up to the vicinity of the highest portion of the element 10.

However, with the increase of the ratio, the sucking up capability tends to be saturated, and the suppression capability of the degradation of the input-output performance tends to be saturated; and the sufficient achievement of the weight reduction also tends to be difficult.

In consideration of such viewpoints, in the nonaqueous electrolyte secondary cell, the ratio is more preferably 20% or more and 70% or less and furthermore preferably 30% or more and 40% or less.

L1 and L2 are determined by a common measurement method.

Specifically, L1 is determined by measuring the length of the gap between the inner surface of the case 2 and the element 10 by the X-ray CT analysis. Alternatively, L2 is determined by measuring the height of the liquid surface of the electrolyte solution by the X-ray CT analysis or ultrasonic measurement.

The nonaqueous electrolyte secondary cell 1 of the present embodiment is preferably a lithium-ion battery cell.

Such a nonaqueous electrolyte secondary cell is preferably mounted, for example, in hybrid electric vehicles (HEVs).

The nonaqueous electrolyte secondary cell of the present invention is as described above, but the present invention is not limited to the foregoing embodiments and can be appropriately modified with respect to the design thereof within the intended scope of the present invention. The operational advantage of the present invention is also not limited to the foregoing embodiments.

The embodiments disclosed herein should be construed in all respects as illustrative but not limiting. The scope of the present invention is not indicated by the foregoing description but by the scope of the claims. The scope of the present invention is intended to include all the modifications equivalent in the sense and the scope to the scope of the claims.

EXAMPLES

Next, the present invention is described in more detail with reference to Examples, but the present invention is not limited to these Examples.

(Test Example)

A nonaqueous electrolyte secondary cell as shown in FIG. 1 to FIG. 4 was used.

Specifically, the positive electrode member was formed by coating an aluminum foil as the positive electrode current collector with lithium cobaltate as a positive electrode active material.

The negative electrode member was formed by coating a copper foil as the negative electrode current collector with hardly graphitizable carbon as a negative electrode active material.

Further, as the separator, a porous film formed of polyethylene was used. The air resistance (JIS P8117, Gurley tester method) of the separator was found to be 220 seconds/100 cc.

An element was formed by stacking the positive electrode member, the negative electrode member and the separator on each other and winding them, and housed in the case.

As the electrolyte solution, a solution prepared by dissolving $LiPF_6$ so as for the concentration to be 1 M in a mixed solvent prepared by mixing EC (ethylene carbonate), DMC (dimethyl carbonate) and EMC (ethyl methyl carbonate) in a volume ratio of 1:1:1 was used.

Nonaqueous electrolyte secondary cells were produced by setting the ratio of L2 to L1 (L2/L1×100) at 0%, 10%, 20%, 30%, 50%, 70% and 100% through the pouring of the electrolyte solution in the case of each of the cells.

A nonaqueous electrolyte secondary cell (also referred to as the reference cell) having the foregoing ratio was also produced, which uses as the separator the separator being formed of the same material as described above and having an air resistance of 80 seconds/100 cc. This reference cell had a ratio of L2 to L1 being 0%.

<Evaluation of Output Power Performance>

By using the nonaqueous electrolyte secondary cells produced as described above, the output power performance of each of the cells was evaluated in the state of each of the cells being installed as shown in FIG. 5.

Specifically, the cell output power was measured for each of the foregoing cells before and immediately after the charge and discharge cycle test performed for 24 hours. The degradation rate of output power performance was calculated by dividing the measured ratio of the cell output power after the charge and discharge cycle test by the measured ratio of the cell output power before the test.

In the charge and discharge cycle test, the charge and discharge cycle was repeated continuously for 24 hours at 25° C., from the SOC of 50%, at 30 ItA for 1 second.

In the cell output power measurement before and after the charge and discharge cycle, the I-V properties at 5, 10, 20, 30 and 50 ItA were acquired, and thus for each of the cells, the 10 second assist power at 25° C. and a SOC of 50% was measured.

Here, SOC is the abbreviation for State of Charge, which is the numerical value representing the charged state of a cell relative to the numerical value of the state of full charge defined to be 100%.

ItA is a value representing a magnitude of the charge current or the discharge current, which is a value formed by attaching It and the unit of current to the multiple of the numerical value representing the nominal capacity of the cell. 1 ItA is a current value when the quantity of electricity equivalent to the nominal capacity of the cell is charged or discharged for one hour.

Figure 8:
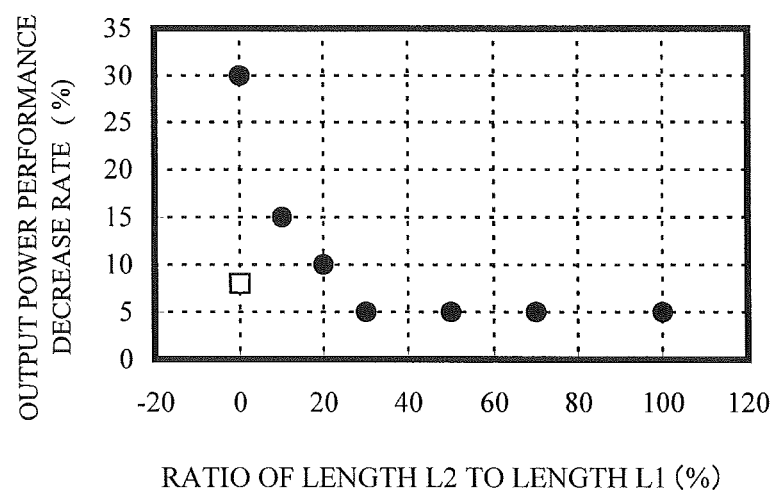
FIG. 8 is a graph showing the relationship between the amount of the electrolyte solution and the output power performance.

FIG. 8 shows the evaluation results of the output power performance of a cell.

As shown in FIG. 8, it has been found that in the nonaqueous electrolyte secondary cell of the present embodiment, when the ratio of L2 to L1 is 10% or more, the degradation of the output performance is remarkably suppressed.

It has been found that when the foregoing ratio is 20% or more, or alternatively 30% or more, the degradation of the output performance is more suppressed. In comparison between the result of the reference cell (indicated with a hollow square) and the result of the cell of the test example in FIG. 8, it has been found that when the air resistance of the separator is 100 seconds/100 cc or more, the ratio (L2/L1×100) of 10% or more remarkably suppresses the degradation of the output performance of the cell.

What is claimed is:

1. A nonaqueous electrolyte secondary cell, comprising:
   a case;
   an element housed in the case, the element comprising a positive electrode member, a negative electrode member, and a separator; and
   an electrolyte solution poured into the case,
   wherein, in a direction perpendicular to a liquid surface of the electrolyte solution, a ratio calculated with formula L2/L1×100% is more than 30% and 40% or less, where L1 represents a length between a first portion of the element, which is at a highest position, and a second portion of the element, which is at a lowest position, and L2 represents a length between the liquid surface and the second portion,
   wherein the separator includes:
     a first separator disposed on a surface of the positive electrode member; and
     a second separator including a same material as the first separator, the second separator being disposed on a surface of the negative electrode member and a surface of the case, and
   wherein, in region L2, the electrolyte solution contacts another surface of the positive electrode member, said another surface of the positive electrode member opposing the surface of the positive electrode member.

2. The nonaqueous electrolyte secondary cell according to claim 1, wherein an air resistance of the separator is 100 seconds/100 cc or more measured by a Gurley tester method in accordance with JIS P8117 of Japanese Industrial Standards (JIS).

3. The nonaqueous electrolyte secondary cell according to claim 2, wherein the air resistance of the separator is 300 seconds/100 cc or less.

4. The nonaqueous electrolyte secondary cell according to claim 1, wherein the nonaqueous electrolyte secondary cell is configured to be charged and discharged with a predetermined current.

5. The nonaqueous electrolyte secondary cell according to claim 4, wherein the predetermined current is performed at 50 A or more.

6. The nonaqueous electrolyte secondary cell according to claim 1, wherein the nonaqueous electrolyte secondary cell is configured to be mounted in a hybrid electric vehicle.

7. The nonaqueous electrolyte secondary cell according to claim 1, wherein L1 is defined as a length of a straight line segment connecting, with a shortest distance, a plane parallel to the liquid surface, passing the highest position of the element, and a plane parallel to the liquid surface, passing the lowest position of the element.

8. The nonaqueous electrolyte secondary cell according to claim 7, wherein L2 is defined as a length of the straight line segment connecting, with a shortest distance, the liquid surface and the plane parallel to the liquid surface, passing the lowest position of the element.

9. The nonaqueous electrolyte secondary cell according to claim 8, wherein a position of the element in the case is configured such that, while the case is rotated from a first position, in which a bottom surface of the case is a lowermost surface of the case, to a second position, in which a side surface of the case located adjacent to the bottom surface is the lowermost surface of the case, the ratio of L2/L1 remains in the range of 30% or more and 40% or less.

10. The nonaqueous electrolyte secondary cell according to claim 1, wherein a position of the element in the case is configured such that, while the case is rotated from a first position, in which a bottom surface of the case is a lowermost surface of the case, to a second position, in which a side surface of the case located adjacent to the bottom surface is the lowermost surface of the case, the ratio of L2/L1 remains in the range of 30% or more and 40% or less.

11. The nonaqueous electrolyte secondary cell according to claim 1, wherein the separator is configured to pass the electrolyte solution while insulating the positive electrode member from the negative electrode member.

12. The nonaqueous electrolyte secondary cell according to claim 1, wherein the separator comprises porous films comprising polyolefin resins.

13. The nonaqueous electrolyte secondary cell according to claim 1, wherein the highest position is a position of one of the positive electrode member, the negative electrode member, and the separator, in the direction perpendicular to the liquid surface, which is positioned highest in a state of the case being installed.

14. The nonaqueous electrolyte secondary cell according to claim 13, wherein the lowest position is a position of one of the positive electrode member, the negative electrode member, and the separator, in the direction perpendicular to the liquid surface, which is positioned lowest in the state of the case being installed.

15. The nonaqueous electrolyte secondary cell according to claim 1, wherein, in a widthwise direction of the element, on one end of the element, an edge of the positive electrode member projects more toward the case than the negative electrode member, the first separator, and the second separator, and on another end of the element, an edge of the negative electrode member projects more toward the case than the positive electrode member, the first separator, and the second separator.

16. The nonaqueous electrolyte secondary cell according to claim 1, wherein the first separator abuts the surface of the positive electrode member,
wherein the second separator abuts the surface of the negative electrode member and the surface of the case, and
wherein the electrolyte solution abuts said another surface of the positive electrode member.

17. A nonaqueous electrolyte secondary cell, comprising:
a case;
an element housed in the case, the element comprising a positive electrode member, a negative electrode member, and a separator; and
an electrolyte solution disposed into the case,
wherein a ratio calculated with formula L2/L1×100% is more than 30% and 40% or less, where L1 is defined as a length of a straight line segment connecting, with a shortest distance, a plane parallel to the liquid surface, passing a highest position of the element, and a plane parallel to the liquid surface, passing a lowest position of the element, and L2 is defined as a length of the straight line segment connecting, with a shortest distance, the liquid surface and the plane parallel to the liquid surface, passing a lowest position of the element,
wherein the separator includes:
a first separator disposed on a surface of the positive electrode member; and
a second separator including a same material as the first separator, the second separator being disposed on a surface of the negative electrode member and a surface of the case, and
wherein, in region L2, the electrolyte solution contacts another surface of the positive electrode member, said another surface of the positive electrode member opposing the surface of the positive electrode member.

18. The nonaqueous electrolyte secondary cell according to claim 17, wherein a position of the element in the case is configured such that, while the case is rotated from a first position, in which a bottom surface of the case is a lowermost surface of the case, to a second position, in which a side surface of the case located adjacent to the bottom surface is the lowermost surface of the case, the ratio of L2/L1 remains in the range of 30% or more and 40% or less.

19. The nonaqueous electrolyte secondary cell according to claim 17, wherein the separator is configured to pass the electrolyte solution while insulating the positive electrode member from the negative electrode member.

* * * * *